United States Patent [19]

Bertina

[11] Patent Number: 4,658,124

[45] Date of Patent: Apr. 14, 1987

[54] KEYBOARD HAVING VARIABLE INCLINATION OF THE KEY PLANE

[75] Inventor: Domenico Bertina, Parella, Italy

[73] Assignee: Ing. C. Olivetti & C., S.p.A., Italy

[21] Appl. No.: 867,608

[22] Filed: May 27, 1986

Related U.S. Application Data

[60] Continuation of Ser. No. 668,685, Nov. 5, 1984, abandoned, which is a division of Ser. No. 435,652, Oct. 21, 1982, Pat. No. 4,563,550.

[30] Foreign Application Priority Data

Oct. 21, 1981 [IT] Italy .............................. 68360 A/81

[51] Int. Cl.[4] .......................... A47F 5/12; B41J 11/56; F16M 11/24; G06C 7/02

[52] U.S. Cl. .................................... 235/145 R; 108/7; 248/188.2; 248/398; 248/677; 400/682; 400/681

[58] Field of Search ........................... 235/145 R, 146; 400/472, 486, 488, 681, 682; 248/677, 173, 185, 188.8, 188.2, 188.4, 397, 398, 673, 188.1, 188.7, 454–456, 649; 340/365 R; 108/6, 7, 8, 9

[56] References Cited

U.S. PATENT DOCUMENTS

| | | | |
|---|---|---|---|
| 1,681,732 | 8/1928 | Gray | 248/677 |
| 2,281,769 | 5/1942 | Hochriem | 248/188.2 X |
| 2,626,456 | 1/1953 | Harrison | 248/188.1 X |
| 3,393,846 | 7/1968 | Cannon et al. | 248/188.2 X |
| 4,402,624 | 9/1983 | Stahl et al. | 400/681 |
| 4,516,508 | 5/1985 | Kako et al. | 248/188.2 X |
| 4,527,149 | 7/1985 | Swensen | 340/365 R |

OTHER PUBLICATIONS

IBM Tech. Disc. Bull., I. Golledge, "Keyboard Tilt Mechanism," vol. 25, No. 6, 11-1982, pp. 2900, 2901.

IBM Tech. Disc. Bull., J. Greenfield et al.; "Keyboard Assembly", vol. 25, No. 8, 1-1983, pp. 4265-4267.

IBM Tech. Disc. Bull.; D. Allen, "Dual Tilt Support Legs for Keypad," vol. 26, No. 7A, 12-1983, pp. 3277, 3278.

IBM Tech. Disc. Bull., "Keyboard Tilt Mechanism", vol. 27, No. 10B, 3-1985, pp. 6100-6102.

IBM Tech. Disc. Bull.; N. Leon et al.; "Adjustable Height Mechanism" vol. 22, No. 2, 7-1979, p. 808.

IBM Tech. Disc. Bull.; T. F. Kelley, Jr. et al.; "Keyboard-Angle Adjustment" vol. 24, No. 12, 5-1982, p. 6556.

IBM Tech. Disc. Bull.; E. H. Frank et al.; "Adjustable Keyboard Mechanism"; vol. 25, No. 4, 9-1982, pp. 1978, 1979.

IBM Tech. Disc. Bull.; J. R. Thorpe; "Mechanism for Multiple Retractable Legs in an Enclosure" vol. 25, No. 6, 11-1982, pp. 2863-2864.

*Primary Examiner*—J. R. Scott
*Attorney, Agent, or Firm*—Banner, Birch, McKie & Beckett

[57] ABSTRACT

A contact keyboard comprising a plurality of modular keys individually insertable in a base frame having feet adjustable in height in order to permit a variable inclination of the key plane. The back feet are pivoted on a shaft internally to lateral sides of the base frame and are provided with edges engaging the support plane for the base frame. The edges have extensive planar portions lying at different distances from the shaft for regulating the inclination of the key plane. The angular position of each back foot is stabilized by a corresponding spring supported by the pivoting shaft and which urges the foot against an associated lateral side of the base frame and causes one of a plurality of notches of the foot to be engaged by a tooth of the associated lateral side of the base frame.

6 Claims, 14 Drawing Figures

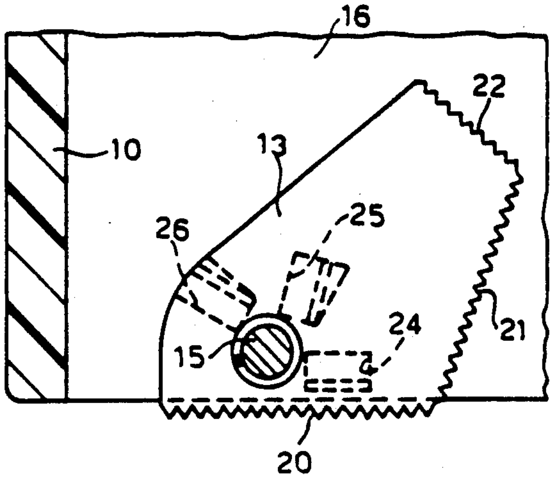
FIG.4
FIG.5
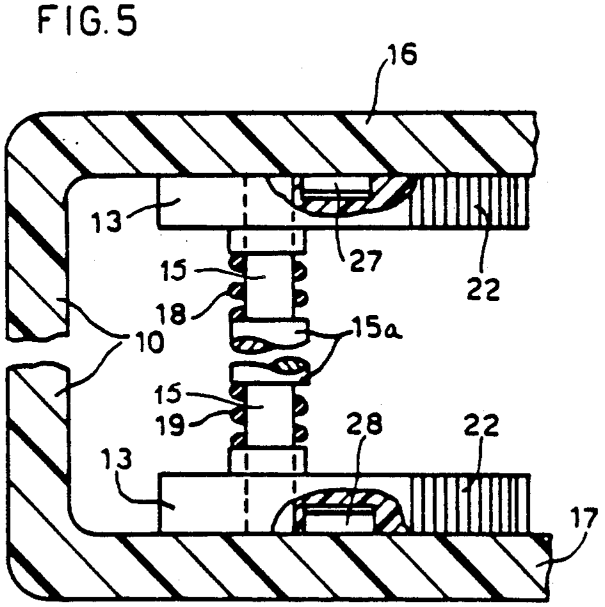

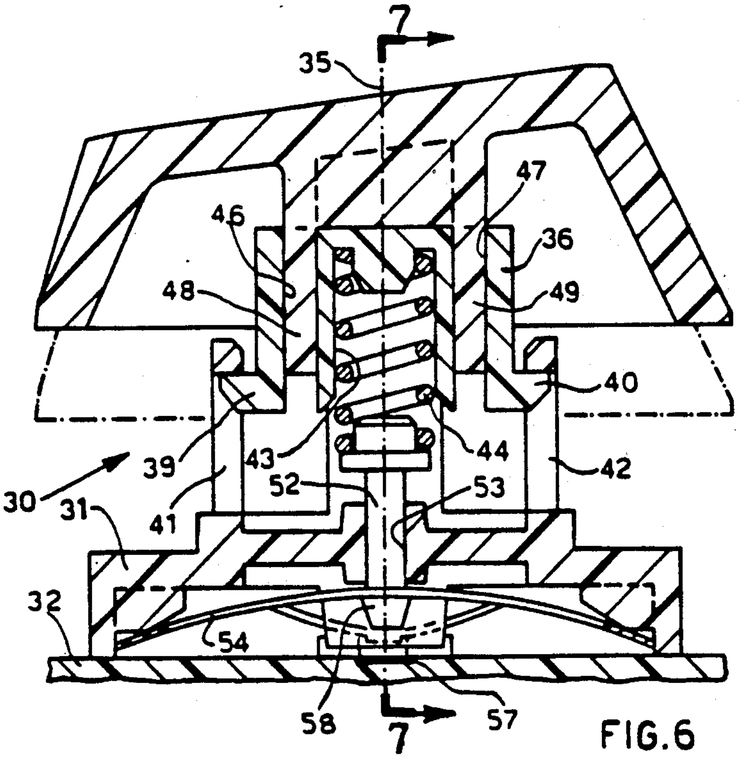
FIG.6
FIG.7
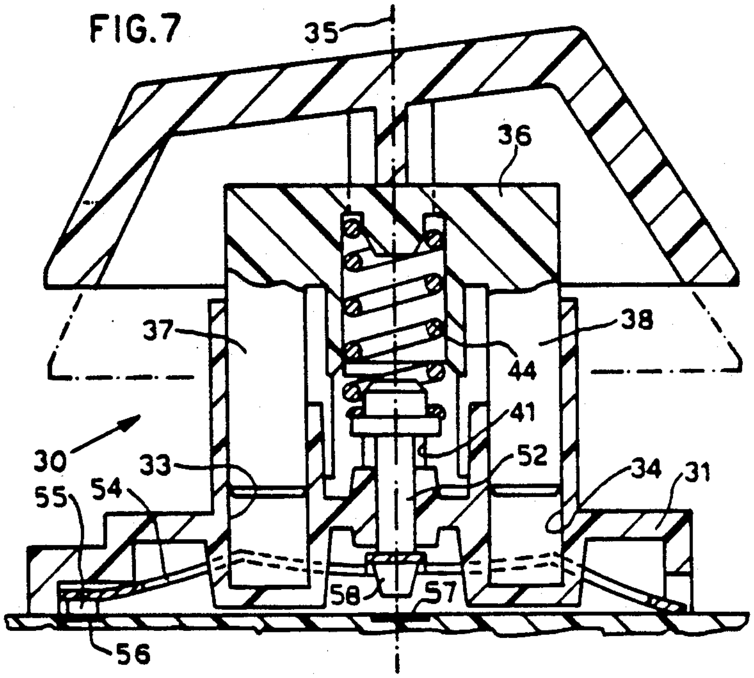

KEYBOARD HAVING VARIABLE INCLINATION OF THE KEY PLANE

This application is a continuation of application Ser. No. 668,685, filed Nov. 5, 1984, now abandoned, which is a division of application Ser. No. 06/435,652, filed Oct. 21, 1982, now U.S. Pat. No. 4,563,550.

BACKGROUND OF THE INVENTION

1. Field of the Invention

The present invention refers to a contact keyboard comprising a plurality of modular keys, individually insertable into a base frame, and in which each key comprises an actuator, axially movable for establishing connection between two parts of an electrical circuit, and an indicatory cap mounted on the actuatable portion of the actuator.

2. Description of the Prior Art

In some known keyboards the connection between the parts of the electrical circuit is made by a conductive lamina which is deformable from a stable configuration with open contacts into an unstable configuration with closed contacts.

Upon depression of a key, the movable actuator performs a predetermined stroke, at the end of which the conductive lamina deforms from its stable to its unstable configuration due to the load of the actuator which overcomes the elastic reaction of the lamina itself. The extent of the deformation of the lamina is usually several millimeters whilst the total height of the key, owing to the dimensions of the cap, the actuator and the slides needed for a reliable actuation, results of the order of several centimeters, which is excessive for some particular uses of the keyboard.

SUMMARY OF THE INVENTION

A first object of the present invention is that of providing a keyboard in which the total height of the keys is greatly reduced, whilst the stroke of the single actuators remains unchanged, so as to obtain a resulting "low profile" keyboard maintaining its characteristics of simplicity, reliability, and economy.

Pursuant to said first object, the keyboard according to the invention is characterized in that each movable actuator is provided with vertical slides diametrically opposite with respect to a sliding central axis of said actuator, and in that a pair of housings suitable to receive the stems of the cap, are formed in the actuator on opposite sides with respect to its central axis and displaced by 90° with respect to the vertical slides.

A second object of the present invention is that of providing a keyboard having some bistable and optionally illuminated keys which are reliable, simple and economical.

Pursuant to said second object the keyboard in accordance with the invention is characterized in that the actuator is provided with a cam-follower bound to move perpendicularly with respect to the actuator's stroke and in that said cam follower is partially lodged in a groove of an element which is fixed to the key and embodies the bistability function of said key.

A third object of the present invention is that of providing a keyboard in which the inclination of the key plane with respect to the support plane may be varied by predetermined angles in a simple manner.

Pursuant to said third object, the keyboard according to the invention is characterized by a pair of feet pivoting upon the base plate and having a plurality of resting surfaces, said surfaces having different distances from the corresponding pivots.

The foregoing and other characteristics of the invention will be clear from the following description of a preferred embodiment, made by way of example and not of limitation, with the aid of the annexed drawing.

BRIEF DESCRIPTION OF THE DRAWING

FIG. 4 is a partially sectioned side view of some enlarged details of the keyboard according to the invention;

FIG. 5 is a partially sectioned plane view of the details of FIG. 4;

FIG. 6 is a sectioned side view of a first key of the keyboard according to the invention;

FIG. 7 is a section along the line 7—7 of FIG. 6;

DESCRIPTION OF THE PREFERRED EMBODIMENTS

Figure 1:
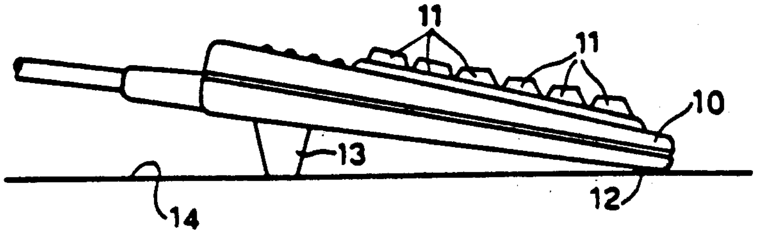
FIG. 1 is a side view of a keyboard in accordance with the invention in a first working position.
Figure 2:
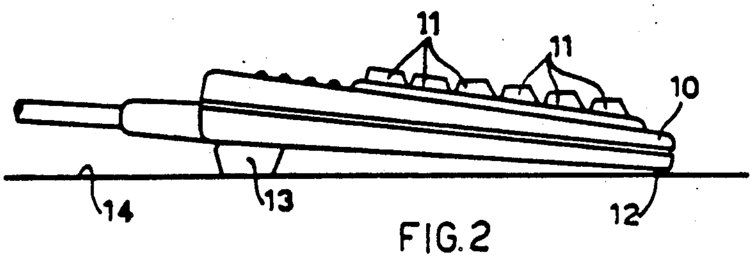
FIG. 2 is a side view of a keyboard in accordance with the invention in a second working position.
Figure 3:
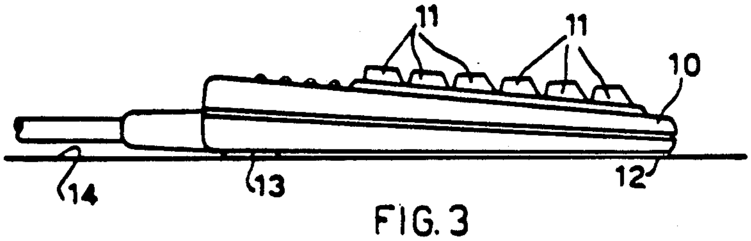
FIG. 3 is a side view of a keyboard in accordance with the invention in a third working position.

With reference to FIG. 1, the keyboard in accordance with the invention comprises a rigid frame 10, having a substantially parallelepiped shape, in which a plurality of keys 11, hereinafter described in detail, are mounted.

The frame 10 is provided underneath with support feet 12 and 13 by means of which it may stand on the plane 14.

According to a characteristic of the present invention the fore feet 12 are fixed, while the back feet 13 may jut out more or less from the bottom of the frame 10, so that the inclination of the key plane 11 with respect to the support plane 14 is variable at the option of the user.

In particular the feet 13 (FIGS. 4 and 5) comprise two plates which are rotatably mounted on a shaft 15 fixed between the inner surfaces of lateral sides 16 and 17 of the frame 10. Each foot 13 is located adjacent to the inner surface of an associated lateral side 16, 17 and is shaped so as to have its edges shaped as shagreened surfaces 20, 21 and 22, of substantially planar configuration. The surfaces 20 and 21 and the surfaces 21 and 22 form two obtuse angles, respectively. The surfaces 20, 21 and 22 are differently spaced from the shaft 15, and the distances of the surfaces 20, 21 and 22 vary from a minimum amount for the surface 20 to a medium amount for the surface 21 to a maximum amount for the surface 22. Moreover each foot 13, on an outer face adjacent to the inner surface of the associated lateral side 16, 17, is provided with positioning notches 24,25 and 26 equally spaced from the shaft 15.

Two positioning teeth 27 and 28 are fixed to the sides 16 and 17 and are suitable to cooperate with the notches 24,25 and 26 of the feet 13.

Two helicoidal springs 18 and 19 engage two corresponding end portions of the shaft 15 are coaxial with the shaft 15. Each spring 18, 19 has an inner end held by a central portion 15*a* of the shaft 15 and an outer end cooperative with an inner face of each foot 13 opposite to its outer face. In this manner, the springs 18 and 19 urge the feet 13 against the inside walls of the corresponding sides 16 and 17 and hold the teeth 27 and 28 inside one of the notches 24, 25 or 26. The keys 11 of the keyboard according to the invention are of two types: monostable and "low" or bistable and "illuminated".

Each "low" key 30 (FIGS. 6 and 7) comprises a body 31 having a substantially rectangular section and is suitable to be removably mounted on a base plate 32. The body 31 is shaped so as to have two cylindrical slides 33 and 34 positioned on opposite sides with respect to a central axis 35 (FIG. 7).

An actuator 36 is slidable along the axis 35 and has two side cylinders 37 and 38 lodged inside the cylindrical slides 33 and 34. The actuator 36 is provided with two side wings 39 and 40 which are lodged into two grooves 41 and 42 of the body 31 and are positioned at 90° with respect to the side cylinders 37 and 38.

The actuator 36 is also provided with a central hollow 43 inside which a helicoidal spring 44 is lodged.

Between the central hollow 43 and the side wings 39 and 40, two through holes 46 and 47 are provided, in which the lower stems 48 and 49 of a cap 50 are fitted in a forced manner; the cap 50, with its specific indication, is easily assemblable with the generic actuator 36. The cap 50 is internally hollow so as to receive the upper portion of the actuator 36.

A striker 52, substantially cyindrically shaped is slidable along the central axis 35 inside a hole 53 of the body 31 and has its upper portion cooperating with the helicoidal spring 44.

The lower portion of the striker 52 cooperates with a spring 54, dome-shaped in its stable state and of known type, for instance as described in the U.S. Pat. No. 4,200,778, issued on Apr. 19, 1980.

The spring 54 is metallic and has one of its ends in continuous contact with the conductive area 56 of a printed circuit formed on the base plate 32. A metallic tablet 58 of the spring 54 is suitable to contact the conductive area 57 of the same printed circuit in order to close a contact, so generating in a known manner, a corresponding electrical signal, when the actuator 36 of the key is depressed by acting on the cap 50.

The actuator 36 has a maximum stroke of about 4 mm., which is a stroke-value common to all the keys for contact keyboards.

Figure 8:
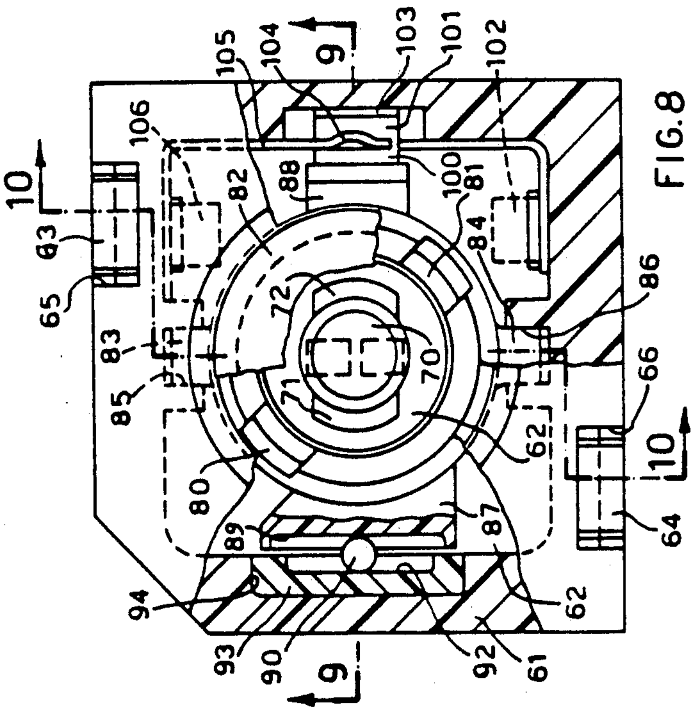
FIG. 8 is a partially sectioned plane view of a second key of the keyboard in accordance with the invention.
Figure 10:
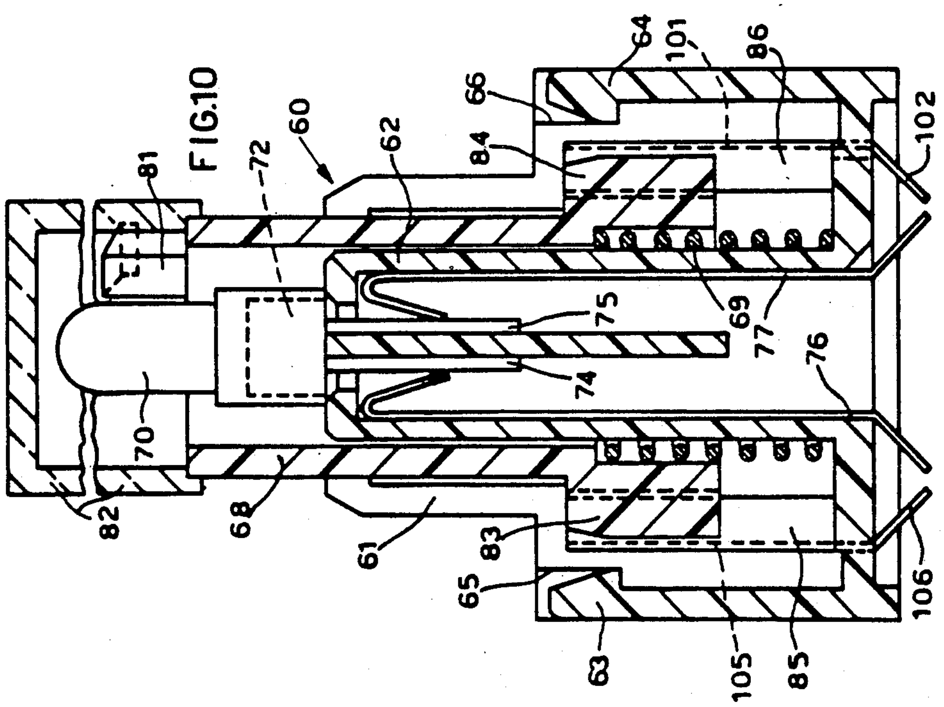
FIG. 10 is a section along the line 10—10 of FIG. 8.
Figure 9:
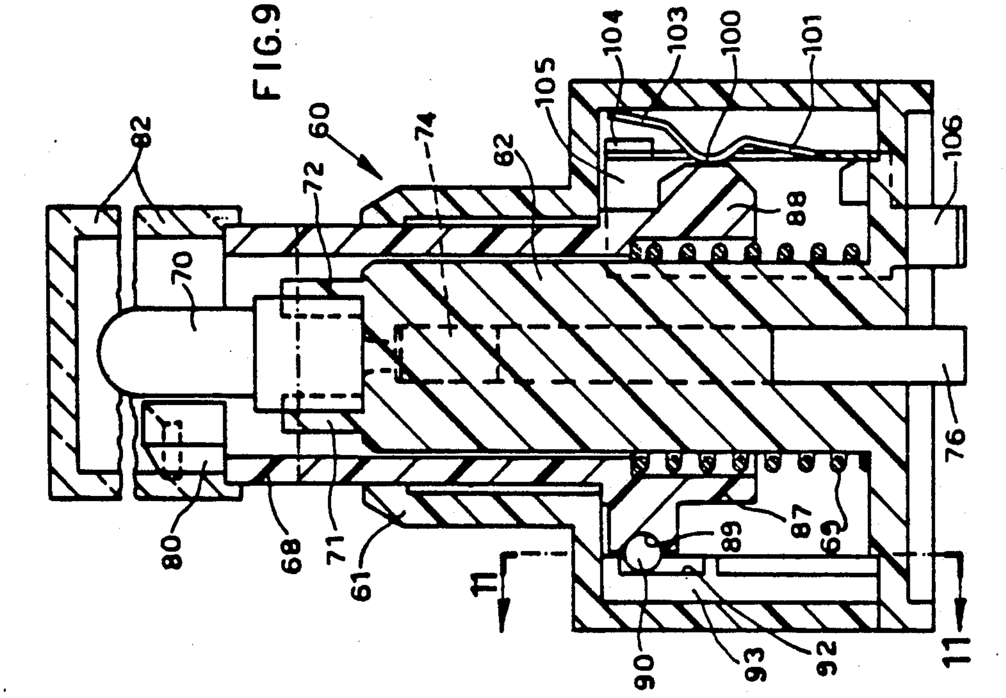
FIG. 9 is a section along the line 9—9 of FIG. 8.

The whole key 30, including the cap 50, has a total height of about 20 mm., which renders it very low and suitable to permit the embodiment of a very flat keyboard of the "low profile" type. This characteristic is due to the fact that the cap 50 lodges on its inside a portion of the active elements of the key, such as the actuator 36 and, when depressed, a portion of the cylindrical slides 33 and 34 of the fixed body 31. An illuminated and bistable key 60 (FIGS. 8, 9 and 10) comprises an external body 61 having a substantially parallelepiped-shaped lower portion of square section, which is hollow and bottomless, and an upper cylindrical-shaped portion.

A lamp-holding element 62 is lodged inside the body 61 and comprises a cylindrical central portion, hollow in its inside, and a base lower portion of squared section which constitutes the bottom of the body 61. A lamp 70 is mounted between the jaws 71 and 72 of the element 62 and includes two electrical terminals 74 and 75 contacting the upper ends of two conductive laminae 76 and 77 lodged inside the element 62 and suitable to be connected, in a known manner, to the electrical circuit portion of the keyboard (not shown in the drawings) so that the lamp 70 may be selectively illuminated.

A substantially cylindrical-shaped slider 68, hollow in its inside, is slidably mounted between the body 81 and the cylindrical upper portion of the lamp-holding element 62. A helicoidal spring 69 is mounted coaxially to the element 62 and continuously urges the slider 68 upwardly.

A cap 82 made by transparent material, is mounted on the upper end of the slider 68 and hinged to two teeth 80 and 81.

The slider 68 is provided in its lower portion with two lateral, vertical and diametrically opposite appendices 83 and 84 (FIG. 8) guided in corresponding inside grooves 85 and 86 of the body 61.

Further, the slider 68 is shaped so as to have two cantilevered elements 87 and 88 diametrically opposite each other and displaced 90° with respect to the side appendices 83 and 84.

A horizontal slide 89 is provided in the element 87, inside of which a sphere 90 is free to slide. Said sphere 90 is partially lodged in a groove 42 (FIG. 11) obtained on a plate 93, which is fitted in a nook 94 of a lateral side of the body 61.

Figure 11:
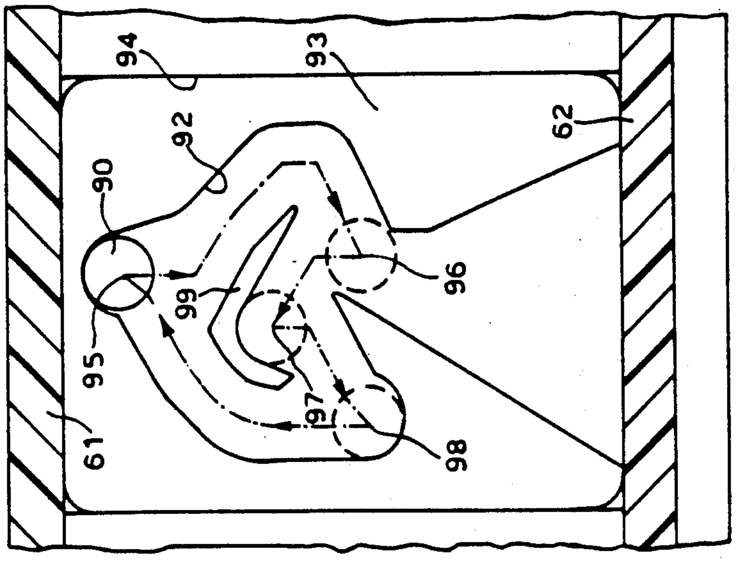
FIG. 11 is a section along the line 11—11 of FIG. 9 according to an enlarged scale.

The groove 92, as is clearly shown in FIG. 11, owing to the position of a retaining wall 99, defines a forced path for the sphere 90. Said path, which is indicated by a dash-dotted line in FIG. 11, is substantially circular and unidirectional and has deadlocks 95,96,97 and 98 which identify positions in which the sphere 90 reverses the vertical direction of its motion, as better described hereinafter.

The element 88 (FIGS. 8 and 9) continuously cooperates with a folding 100 of a metallic, flexible lamina 101 which is shaped so as to have a lower end 102 which juts out from the lower portion of the element 62, and an upper end 103 suitable to selectively contact an end of a metallic lamina 105.

Also the metallic lamina 105 has the lower end 102 jutting out from the lower portion of the element 62. The two ends 102 and 106 are suitable to be connected, in a known manner, to the electrical circuit part of the keyboard, not shown in the drawings.

The operation of the illuminated and bistable key 60 is as follows.

In a first stability condition the key 60 has the slider 68 urged upwardly by the spring 69. In this position the element 88 holds the upper end 103 of the lamina 101 disconnected from the end 104 of the lamina 105. Further in said condition the lamp 70 may be switched on or off, independently from the position of the slider 68, or it might be associated to the slider 68 and be switched off when the slider 68 is lowered. When the slider 68 is pushed downwards, against the action of the spring 69, the sphere 90 inside the groove 92 (FIG. 11) moves along the forced path until it reaches the lower deadlock 96. When the sphere 90 has reached this position, the slider 68 cannot be lowered any further, since its lower end contacts the bottom of the element 62.

Upon release, the slider 68, always urged by the spring 69, returns upwards until it comes to rest when the sphere 90 reaches the intermediate deadlock 97.

In this second condition of stability, the key 60 has the slider 68 partially lowered, with the element 88 no longer cooperating with the portion 100 of the flexible lamina 101; therefore the two ends 103 and 104 of the laminae 101 and 105 are in contact and a corresponding electrical signal may be generated, in a known manner, by the electrical circuit part of the keyboard.

In order to return the key 60 to the first stability condition, the slider 68 is lowered again until the sphere 90, by continuing in its circular and unidirectional motion along the forced path inside the groove 92, reaches the second lower deadlock 98.

The slider 68 is now released in order that the sphere 90 may bring it back to its initial position, i.e. with the sphere 90 positioned in the upper deadlock 95.

Figure 13:
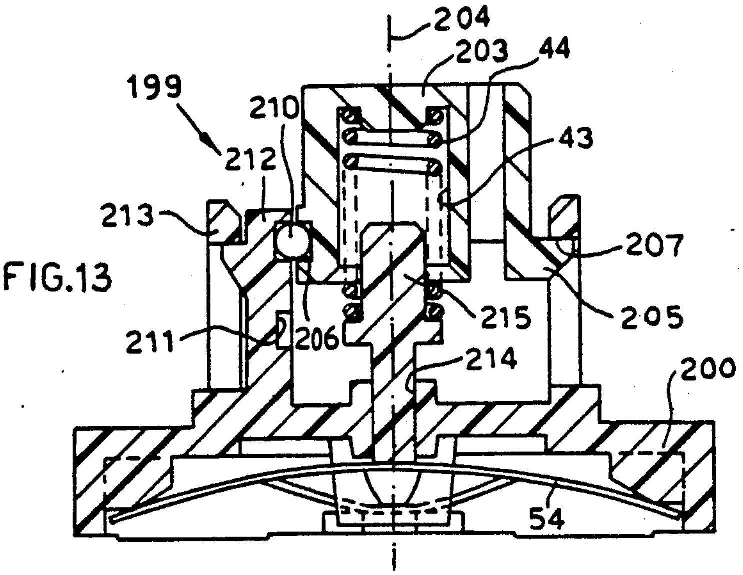
FIG. 13 is a section along the line 13—13 of FIG. 12.
Figure 12:
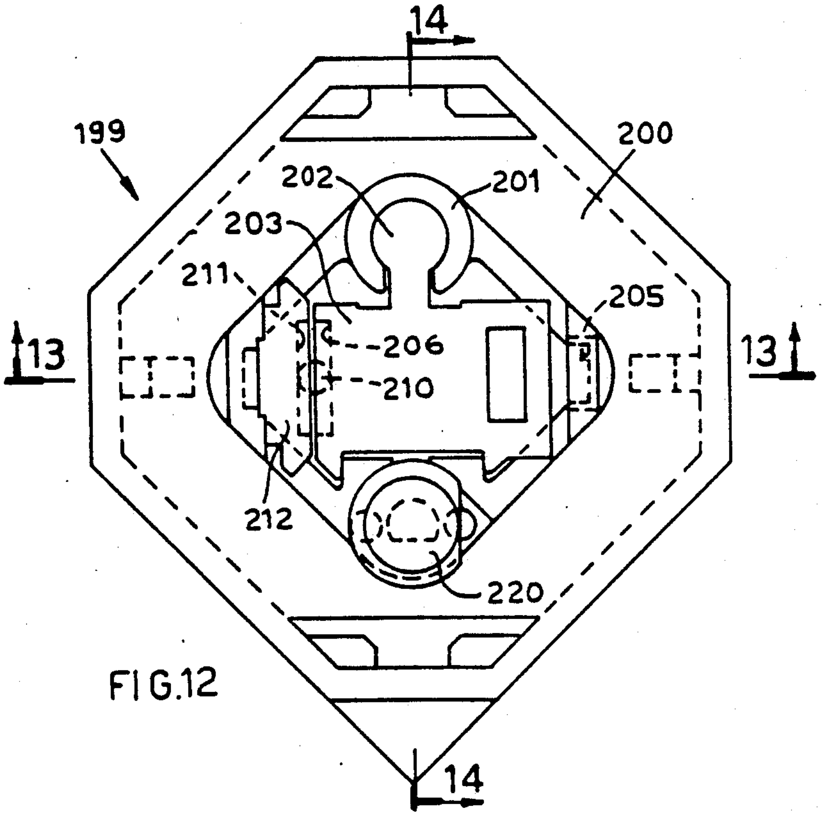
FIG. 12 is a plane view of a third key of the keyboard in accordance with the invention.
Figure 14:
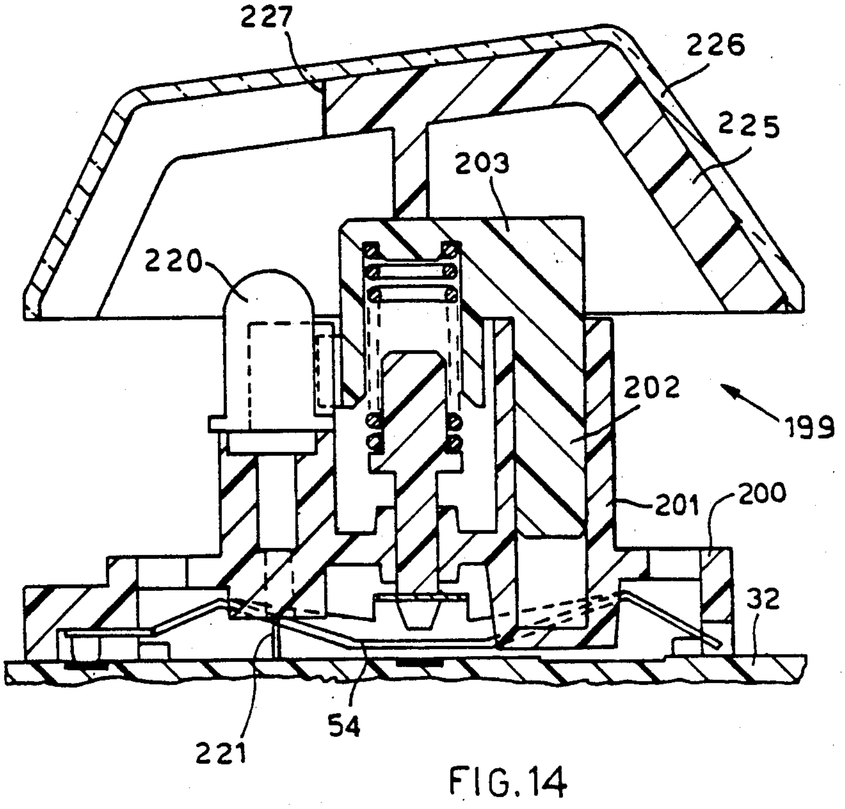
FIG. 14 is a section along the line 14—14 of FIG. 12.

In FIGS. 12, 13 and 14 a third type of key 199 of the keyboard is represented in accordance with the present invention.

This key 199 comprises a body 200 having a substantially rectangular section and which is suitable to be removably mounted on the base plate 32. The body 200 has a vertical cylindrical slide 201, on which is lodged a cylinder 202 of an actuator 203, which is slidable along an axis 204. The actuator 203 is provided with a side wing 205 which is lodged in a groove 207 of the body 200 and is positioned at 90° with respect to the cylinder 202.

The actuator 203 is also provided with a horizontal slide 206, perpendicular to the axis 204, inside which a sphere 210 is free to slide. This sphere 210 is also partially lodged in a groove 211 obtained in a plate 212 which is mounted on a lateral side 213 of the body 200.

The actuator 203, as the actuator 36, is also provided with a central hollow 43 inside which a helicoidal spring 44 is lodged. A striker 215 is slidable along the central axis 204 inside a hole 214 of the body 200 and has its upper portion cooperating with the spring 44. The lower portion of the striker 215 cooperates with a spring 54, dome-shaped.

The groove 211 is similar to the groove 92 clearly shown in FIG. 11, and permits to the actuator 203 to stop in two different stable positions, as the actuator 68 of the key described hereinbefore.

Moreover the key 199 comprises a light emitter diode (LED) 220 which is mounted on the body 200 at the opposite side of the cylindrical slide 201 with respect to the axis 204. The LED 220 has two lower terminals 221 connected in a known manner to the electric circuit of the base plate 32.

The LED 220, like the lamp 70, may be switched on or off independently from the position of the actuator 203. A cup 225, mounted on the actuator 203, has a transparent cover 226, and is provided with an aperture 227 through which the light emitted by LED 220 is visible by the operator.

In this manner the key 199 is "low", bistable and "illuminated".

Obviously, additions and modifications may be made to the contact keyboard described above, without departing from the scope and the spirit of the present invention. For instance, as an alternative to the sphere 90, another cam-following element of the oscillating type might be used, which might be hinged to the slider 68 by a shaft and might cooperate with the groove 92, so as to move perpendicularly with respect to the sliding direction of the slider 68.

What I claim is:

1. A keyboard comprising a frame, a plurality of keys mounted in said frame and defining a key plane; and means for modifying the inclination of said key plane with respect to a support plane for said frame, wherein said inclination modifying means comprise a pair of support feet pivotally mounted on and in said frame, said pair of support feet having peripheral edge means engaging the support plane, positioning means defining a given number of different stable angular positions of said pair of support feet with respect to said frame, said positioning means includes a teeth and notches coupling between said support feet and said frame and plural spring means for holding said teeth and notches coupling in engagement to define the stable angular positions of said support feet, said support feet being rotated from one to another of said stable angular positions by forcing the engagement of said teeth and notches coupling against the action of said plural spring means, said peripheral edge means of each of said support feet comprises a number of sections equal to said given number of different, stable angular positions, said sections having extensive planar portions lying on different distances from said pivot means for causing each of said planar portions to cooperate planarly with said support plane for each one associated position of the stable positions of said support feet.

2. A keyboard according to claim 1, wherein said support feet are pivoted on said frame by means of a shaft fixed inside on said frame and about which each of said support feet is rotatable and wherein said spring means comprise a pair of helicoidal plural springs individually supported by said shaft for individually urging each of said support feet against said frame.

3. A keyboard according to claim 1, wherein said teeth and notches coupling comprises a tooth on each of two inner sidewalls of said frame and a plurality of notches on each support foot and wherein each of said plurality of notches engages said tooth to define one associated stable position under the urging of said plural spring means.

4. A keyboard according to claim 1, wherein each of said extensive planar portions of the support feet has a shagreened surface.

5. A keyboard according to claim 1, wherein said extensive planar portions define in section an obtuse angle therebetween.

6. A keyboard according to claim 1, wherein said given number of stable angular positions is three, said frame comprises two side walls each one having an inner surface associated with said support feet and each support foot comprises a plate pivoted on a shaft carried internally by said side walls and having three extensive planar portions associated with said three stable angular positions, wherein said teeth and notches coupling comprises for each support foot a tooth of the inner face of one of said two side walls and three notches on the plate of one associated support foot and wherein said plural spring means urge said plate of one associated support foot against the inner face of one side wall to cause said tooth to be engaged by one of said notches.

* * * * *